Sept. 11, 1928.

D. P. RANKIN 1,683,697

SPIRALLY WOUND METALLIC BELT

Filed May 14, 1926

Inventor
David P. Rankin

By Bacon sshumas

Attorneys

Patented Sept. 11, 1928.

1,683,697

UNITED STATES PATENT OFFICE.

DAVID P. RANKIN, OF KEARNEY, NEBRASKA.

SPIRALLY-WOUND METALLIC BELT.

Application filed May 14, 1926. Serial No. 109,121.

This invention relates to improvements in metallic belts adapted for transmitting power from a driving to a driven shaft.

The invention has for its particular object the idea of connecting the adjacent ends of a spirally wound belt in such a manner that they will be securely held in position and capable of withstanding the rough usage to which such belts are subjected.

More specifically the invention comprehends the idea of interposing between the adjacent ends of a spirally wound belt, a filler plug which is notched intermediate its ends to define a flattened portion capable of receiving the extremities of the wire constituting the belt and of also forming shoulders against which the ends of the wire belt engage and are prevented form separation.

In the drawings,

Figure 1 represents a perspective view of the assembly, while

Figure 1:
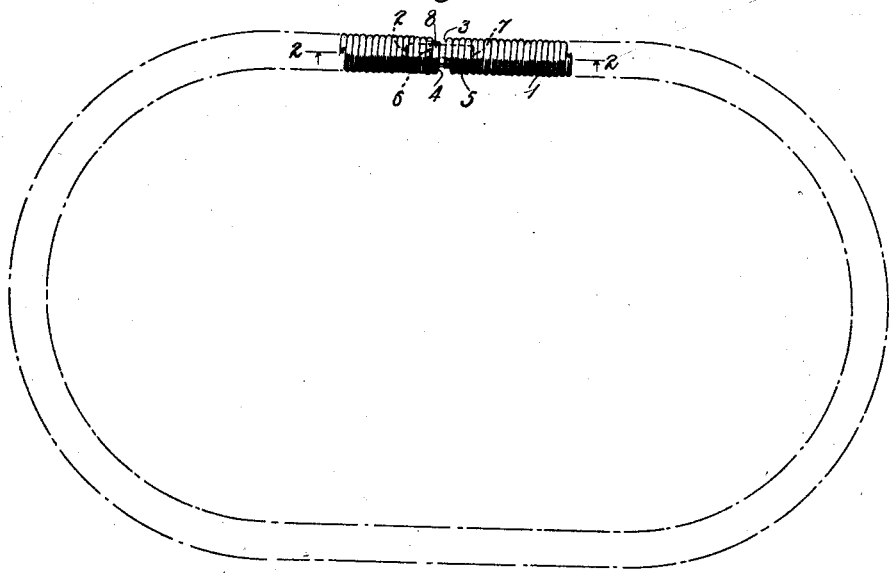
Figure 2:
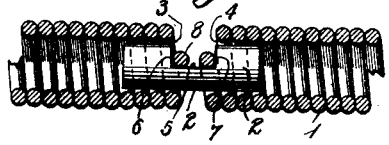
Figure 2 represents a detailed view of the filler plug.
Figure 3:
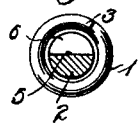
Figure 4:
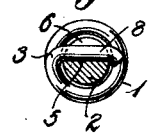

Referring now more particularly to the drawings, wherein like reference characters indicate corresponding parts, the numeral 1 designates a belt formed of coil wire. This construction of belt facilitates a flexible drive and has been found to be very satisfactory in transmitting effort from a driving shaft to a driven shaft for a number of machines. The present invention contemplates the idea of inexpensively and yet efficiently securing the adjacent ends of the coil metallic belt together. To this end, I employ a filler plug 2 inserted between the adjacent ends 3 and 4 of the coil wire belt. This filler plug is provided with a cut-out portion 5 extending transversely thereacross, defining shoulders 6 and 7. In operation, this filler plug is first inserted within the hollow spirally wound belt, and then the wire extremity of one end of the belt is bent down as indicated at 8 to engage and prevent dislodgement of the filler plug from within the confines of the hollow plug. It will be observed that the said shoulders 6 and 7 formed by the recess or cut-out portion aforesaid constitute an abutment for preventing the filler plug being pulled out by reason of its engagement with the wire extremity aforesaid.

The operation of securing the filler plug to the adjacent end of the wire belt is exactly the same, and need not be described in detail.

It will be seen from the foregoing that an efficient locking engagement between the filler plug and the coil belt is performed without the use of extraneous fastening devices, the only operation being necessary is the bending of the ends of the wires constituting the belt downwardly until they extend below the shoulders and within the recess.

It will be understood that this connection and method may be utilized in various forms and sizes of belts, and I do not limit myself to the exact arrangement of parts or construction thereof.

Having thus described my invention, what I claim is:

A spirally wound metallic belt having a series of convolutions of uniform size and of hollow formation, a filler plug disposed between the adjacent ends of the uniformly sized convolutions of the belt, said filler plug having a cut-out portion presenting a flat horizontal base and two flat vertically disposed shoulders, the ends of the convolutions of the belt being bent inwardly to conform to the flat base aforesaid and engaging the flat sides defined by the recess to thereby prevent separation of the adjacent ends of the belt.

In testimony whereof I affix my signature.

DAVID P. RANKIN.